US012659572B2

(12) United States Patent　　　(10) Patent No.:　US 12,659,572 B2

Yoshida　　　　　　　　　　　　　　　(45) Date of Patent:　　Jun. 16, 2026

(54) COMMUNICATION APPARATUS, CONTROL METHOD THEREFOR, AND STORAGE MEDIUM

(71) Applicant: CANON KABUSHIKI KAISHA, Tokyo (JP)

(72) Inventor: Ibuki Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 89 days.

(21) Appl. No.: 18/673,016

(22) Filed: May 23, 2024

(65) Prior Publication Data

US 2024/0406332 A1　　Dec. 5, 2024

(30) Foreign Application Priority Data

May 29, 2023　(JP) ................................. 2023-087975

(51) Int. Cl.
　H04N 23/63　　　(2023.01)
　H04N 1/32　　　(2006.01)
　H04N 101/00　　(2006.01)

(52) U.S. Cl.
　CPC ....... H04N 23/633 (2023.01); H04N 1/32112 (2013.01); H04N 1/32117 (2013.01); H04N 2101/00 (2013.01); H04N 2201/3229 (2013.01); H04N 2201/3247 (2013.01)

(58) Field of Classification Search
　CPC ........... H04N 1/32112; H04N 1/32117; H04N 23/631; H04N 23/633; H04N 2201/00; H04N 2201/3229; H04N 2201/3247
　See application file for complete search history.

(56) References Cited

U.S. PATENT DOCUMENTS

| | | | |
|---|---|---|---|
| 2011/0097058 A1* | 4/2011 | Fan Jiang ............ | G11B 27/309 386/E5.001 |
| 2012/0030723 A1* | 2/2012 | Baum ............ | H04N 21/234327 725/105 |
| 2014/0218545 A1* | 8/2014 | Matsushita ........... | G06F 16/583 348/207.1 |
| 2018/0241836 A1* | 8/2018 | Arsenault ............... | H04L 65/65 |
| 2024/0357225 A1* | 10/2024 | Ozawa ................. | H04N 23/633 |

FOREIGN PATENT DOCUMENTS

| | | |
|---|---|---|
| JP | 2013142751 A | 7/2013 |
| JP | 2022096304 A | 6/2022 |

* cited by examiner

*Primary Examiner* — Daniel M Pasiewicz

(74) *Attorney, Agent, or Firm* — Canon U.S.A., Inc. IP Division

(57)　　　　　　　ABSTRACT

A communication apparatus includes a network interface that communicates with an image capture apparatus, a display device configured to display a file obtained from the image capture apparatus via the network interface, at least one memory for storing the obtained file which is being displayed on the display device, and also storing executable instructions, and at least one processor, that upon execution of the stored instructions, is configured to determine whether the obtained file being displayed on the display device is a chunk recording file, and restrict storage of the obtained file when it is determined that the obtained file to be stored is a chunk recording file.

11 Claims, 8 Drawing Sheets

| FILE NAME | IMAGE CAPTURING DATE/TIME | MOVING IMAGE RECORDING TIME |
|---|---|---|
| | 401 | 402 | 403 |
| MVIB0001.MP4 | 2023.01.02 09:30:20 | 00:30 |
| MVID0002.MP4 | 2023.01.02 09:30:50 | 00:30 |
| MVID0003.MP4 | 2023.01.02 09:31:20 | 00:30 |
| MVIE0004.MP4 | 2023.01.02 09:31:45 | 00:25 |
| MVIB0001.XML | — | — |

| FILE NAME | IMAGE CAPTURING DATE/TIME | MOVING IMAGE RECORDING TIME |
|---|---|---|
| | 401 | 402 | 403 |
| MVIP0001.MP4 | 2023.01.02 09:45:34 | 03:52 |
| MVIP0001.XML | — | — |
| MVIP0002.MP4 | 2023.01.02 10:12:23 | 12:20 |
| MVIP0002.XML | — | — |

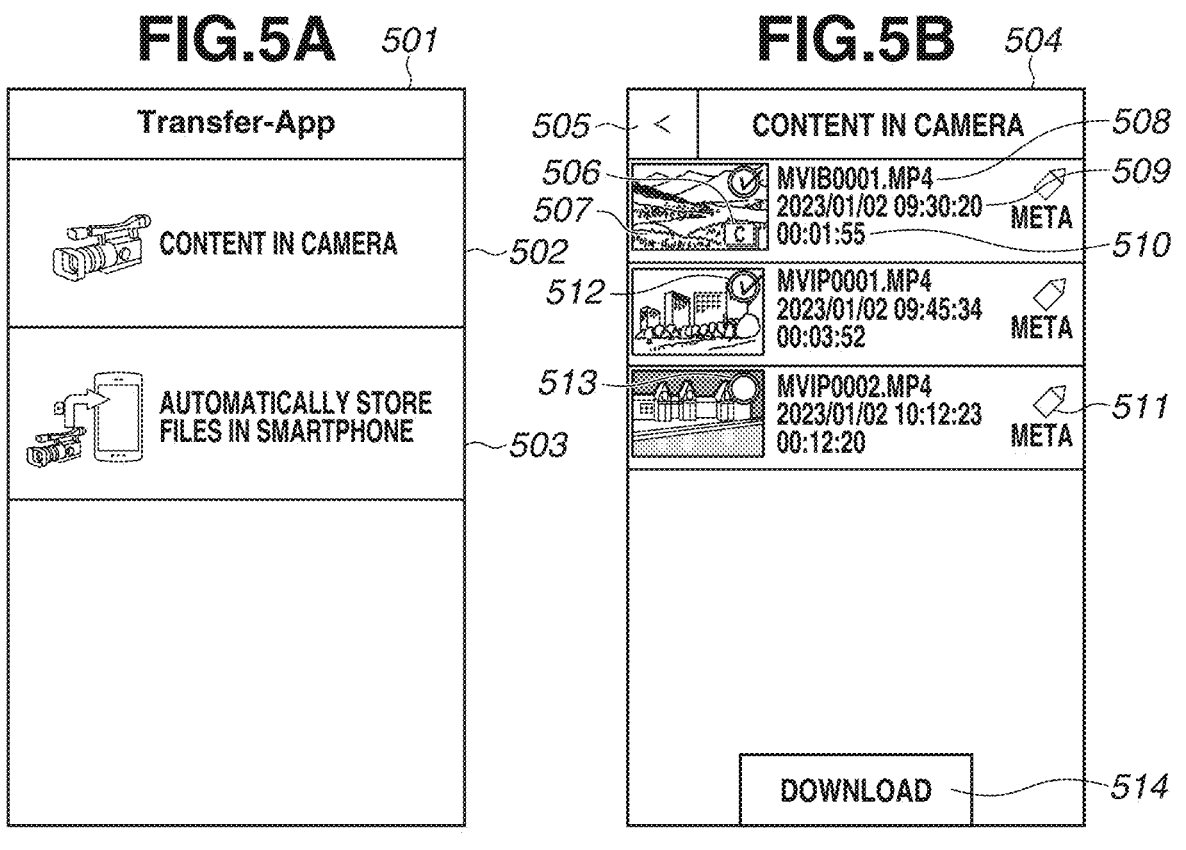

Transfer-App

CONTENT IN CAMERA — *502*

AUTOMATICALLY STORE
FILES IN SMARTPHONE — *503*

*505* — < | CONTENT IN CAMERA — *508*

*506* —
*507* —

| MVIB0001.MP4 — *509*
2023/01/02 09:30:20
00:01:55 — *510*
META

*512* — | MVIP0001.MP4
2023/01/02 09:45:34
00:03:52
META

*513* — | MVIP0002.MP4
2023/01/02 10:12:23 — *511*
00:12:20
META

DOWNLOAD — *514*

FIG.5C

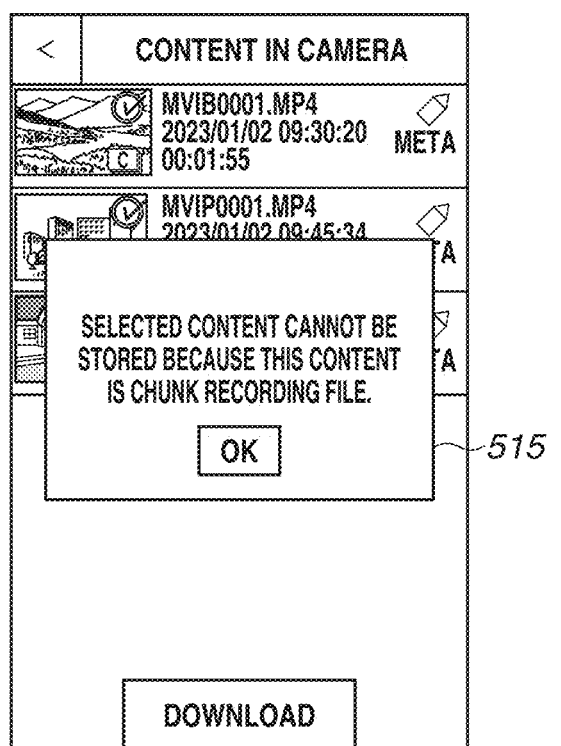

< | CONTENT IN CAMERA

MVIB0001.MP4
2023/01/02 09:30:20
00:01:55
META

MVIP0001.MP4
2023/01/02 09:45:34
TA

SELECTED CONTENT CANNOT BE
STORED BECAUSE THIS CONTENT
IS CHUNK RECORDING FILE.

OK

*515*

DOWNLOAD

FIG.5D

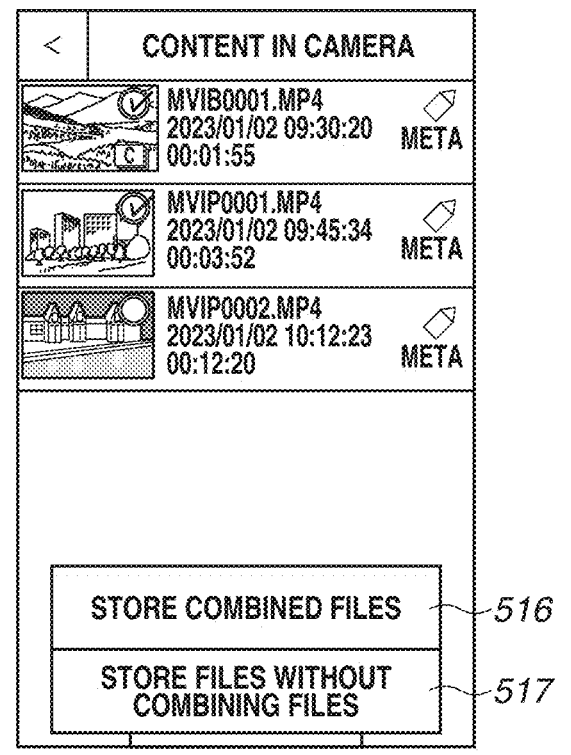

< | CONTENT IN CAMERA

MVIB0001.MP4
2023/01/02 09:30:20
00:01:55
META

MVIP0001.MP4
2023/01/02 09:45:34
00:03:52
META

MVIP0002.MP4
2023/01/02 10:12:23
00:12:20
META

STORE COMBINED FILES — *516*

STORE FILES WITHOUT
COMBINING FILES — *517*

COMMUNICATION APPARATUS, CONTROL METHOD THEREFOR, AND STORAGE MEDIUM

BACKGROUND

Field

The present disclosure relates to a communication apparatus connectable to an external apparatus via wireless communication.

Description of the Related Art

As discussed in Japanese Patent Application Laid-Open No. 2022-96304, a technique for dividing moving image data into a plurality of files and recording the plurality of files to ensure the real-time transmission of a moving image has heretofore been known.

As discussed in Japanese Patent Application Laid-Open No. 2013-142751, a mobile terminal configured to access an image capturing apparatus to obtain and view content stored in the image capturing apparatus is also known.

The technique for dividing moving image data as discussed in Japanese Patent Application Laid-Open No. 2022-96304 is used to enhance the transmission efficiency, and thus is not suitable for the intended use of viewing content as discussed in Japanese Patent Application Laid-Open No. 2013-142751. For example, if a user has accidentally received some of the divided files, incomplete moving image data can be stored in the mobile terminal, which may result in troublesome operation for deletion, or may result in interfering with viewing of another file. This may impair user convenience.

SUMMARY

According to an aspect of the present disclosure, a communication apparatus includes a network interface that communicates with an image capture apparatus, a display device configured to display a file obtained from the image capture apparatus via the network interface, at least one memory for storing the obtained file which is being displayed on the display device, and also storing executable instructions, and at least one processor, that upon execution of the stored instructions, is configured to determine whether the obtained file being displayed on the display device is a chunk recording file, and restrict storage of the obtained file when it is determined that the obtained file to be stored is a chunk recording file.

Further features of the present disclosure will become apparent from the following description of exemplary embodiments with reference to the attached drawings.

BRIEF DESCRIPTION OF THE DRAWINGS

FIGS. 5A to 5D each illustrate a screen user interface (UI) for a transfer application of the communication apparatus according to the first exemplary embodiment.

DESCRIPTION OF THE EMBODIMENTS

Exemplary embodiments of the present disclosure will be described in detail below with reference to the attached drawings.

The following exemplary embodiments are examples of means for implementing the present disclosure, and may be modified or changed as appropriate depending on the configuration of an apparatus to which the present disclosure is applied and various conditions. The exemplary embodiments may be combined as appropriate.

<System Configuration>

Figure 1:
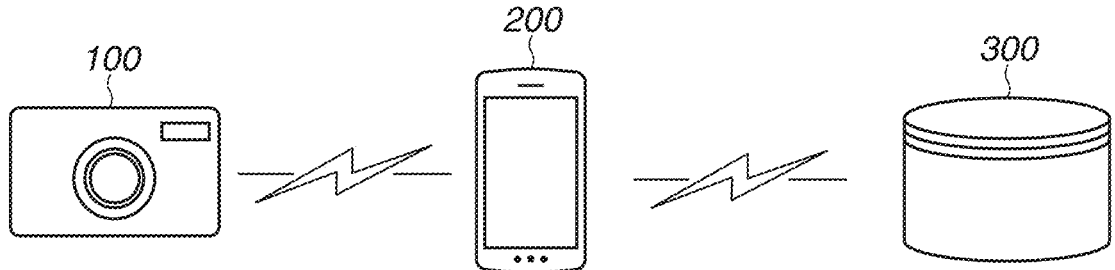
FIG. 1 is a diagram illustrating a system configuration according to a first exemplary embodiment.

FIG. 1 is a schematic diagram illustrating a system configuration according to a first exemplary embodiment of the present disclosure.

An image capturing apparatus 100 illustrated in FIG. 1 is, for example, a digital camera. A communication apparatus 200 functions as a mobile terminal and is an example of an information processing apparatus including a communication function as typified by a smartphone or a computer. A server 300 is an image storage apparatus installed at a destination of a connection established via a communication network such as the Internet.

The image capturing apparatus 100 and the communication apparatus 200 illustrated in FIG. 1 are connected via wired communication or wireless communication by means of connection, such as a wired cable or Wi-Fi®, and thus, moving image files and audio files generated in the image capturing apparatus 100 can be transferred to the communication apparatus 200. The communication apparatus 200 and the server 300 are connected by means of communication, such as mobile data communication or the like, and thus, information stored in the communication apparatus 200 can be transferred to the server 300 via communication using a file transfer protocol (FTP) or the like.

The system configuration is not limited to this example. For example, the image capturing apparatus 100, the communication apparatus 200, and the server 300 may be connected to the same network via an access point without using mobile data communication, to thereby implement file transfer processing among the apparatuses.

<Configuration of Image Capturing Apparatus 100>

Figure 2A:
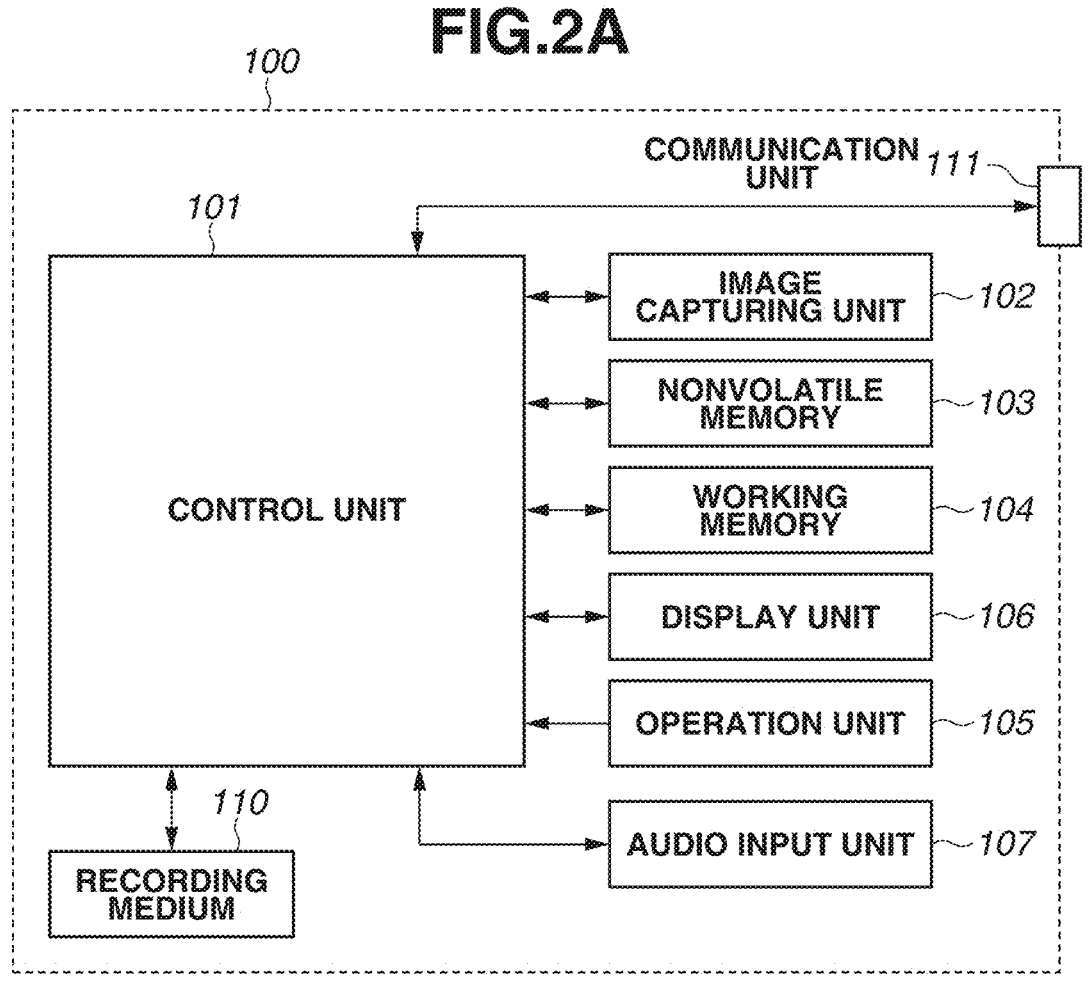
FIG. 2A is block diagram illustrating an example of a configuration of an image capturing apparatus according to the first exemplary embodiment, and FIGS. 2B and 2C each illustrate an external view of the image capturing apparatus.

FIG. 2A is a block diagram illustrating an example of a hardware configuration of the image capturing apparatus 100 according to the present exemplary embodiment. A digital camera is described as an example of the image capturing apparatus 100 according to the present exemplary embodiment. However, the image capturing apparatus 100 is not limited to this example. For example, the image capturing apparatus 100 may be a mobile media player, a tablet device, or an information processing apparatus such as a personal computer.

A control unit 101 is one or more processors for controlling each unit of the image capturing apparatus 100 based on input signals and programs to be described below. While a control unit 201 controls the entire apparatus in the present exemplary embodiment, a plurality of pieces of hardware may share processing to control the entire apparatus.

An image capturing unit 102 includes, for example, an optical system for controlling an optical lens unit, a diaphragm, zooming, focusing, and the like, and an image sensor for converting light (video image) introduced through the optical lens unit into an electrical video signal. As the image sensor, a complementary metal oxide semiconductor (CMOS) sensor or a charge-coupled device (CCD) sensor is generally used. The image capturing unit 102 is controlled by the control unit 101 so that object light focused by a lens included in the image capturing unit 102 is converted into an electric signal by the image sensor, noise reduction processing or the like is performed on the electric signal, and then digital data is output as moving image data. In the image capturing apparatus 100 according to the present exemplary embodiment, the moving image data is recorded on a recording medium 110.

A nonvolatile memory 103 is an electrically erasable and recordable nonvolatile memory, and stores programs to be executed by the control unit 101 (described below), meta template information, and the like.

A working memory 104 is used as a buffer memory for temporarily holding moving image data captured by the image capturing unit 102, a moving image display memory for a display unit 106, a work area for the control unit 101, or the like.

An operation unit 105 is used to receive instructions for the image capturing apparatus 100 from a user. The operation unit 105 includes, for example, a power button for the user to issue a power ON/OFF instruction for the image capturing apparatus 100, a release switch for the user to issue an image capturing start/stop instruction, and a playback button for the user to issue a moving image data playback instruction. The operation unit 105 also includes an operation member such as a dedicated connection button for starting communication with an external device via a communication unit 111 to be described below. The operation unit 105 also includes a touch panel formed on the display unit 106 to be described below.

The display unit 106 displays a viewfinder image during image capturing, displays captured moving image data, and displays texts for interactive operation. The display unit 106 need not necessarily be incorporated in the image capturing apparatus 100. The image capturing apparatus 100 may be connectable to an internal or external display unit 106, and may include at least a display control function for controlling display of the display unit 106.

An audio input unit 107 is a device for inputting audio information. Audio data converted from the audio information by the audio input unit 107 is recorded in an audio file format on the recording medium 110.

The recording medium 110 is configured to record moving image data output from the image capturing unit 102 and audio data output from the audio input unit 107. The recording medium 110 may be configured to be attached to and detached from the image capturing apparatus 100, or may be incorporated in the image capturing apparatus 100.

In other words, the image capturing apparatus 100 may include at least means for accessing the recording medium 110.

The communication unit 111 is an interface for connecting to an external apparatus. The image capturing apparatus 100 according to the present exemplary embodiment can exchange data with the external apparatus via the communication unit 111. For example, moving image data generated by the image capturing unit 102 and audio data generated by the audio input unit 107 can be transmitted to the external apparatus via the communication unit 111. In the present exemplary embodiment, the communication unit 111 includes an interface for communication with the external apparatus via a wireless local area network (LAN) in conformance with the Institute of Electrical and Electronics Engineers (IEEE) 802.11 standard. The communication unit 111 also includes a universal serial bus (USB) interface for communication with the external apparatus via a USB cable. The control unit 101 controls the communication unit 311 to implement wireless communication and wired communication with the external apparatus.

The communication unit 111 of the image capturing apparatus 100 according to the present exemplary embodiment has an access point mode (hereinafter referred to as an AP mode) for operating as an access point in an infrastructure mode. The communication unit 111 further has a client mode (hereinafter referred to as a CL mode) for operating as a client in the infrastructure mode. When the communication unit 111 operates in the CL mode, the image capturing apparatus 100 according to the present exemplary embodiment can operate as a CL device in the infrastructure mode. When the image capturing apparatus 100 operates as a CL device, the image capturing apparatus 100 can join a network formed by a nearby AP device by connecting to the AP device. When the communication unit 111 operates in the AP mode, the image capturing apparatus 100 according to the present exemplary embodiment can operate as a simplified AP (hereinafter referred to as a simple AP) which is a kind of AP but has limited functions.

When the image capturing apparatus 100 operates as a simple AP, the image capturing apparatus 100 forms a network by itself. An apparatus in the vicinity of the image capturing apparatus 100 can recognize the image capturing apparatus 100 as an AP device and can join the network formed by the image capturing apparatus 100. As described above, a program for causing the image capturing apparatus 100 to operate is held in the nonvolatile memory 103.

The image capturing apparatus 100 according to the present exemplary embodiment is a simple AP, which is a kind of AP, but does not include a gateway function for transferring data received from the CL device to an Internet provider or the like. Accordingly, even if the image capturing apparatus 100 receives data from another apparatus that has joined the network formed by the image capturing apparatus 100, the data cannot be transferred to a network such as the Internet.

Figures 2B, 2C:
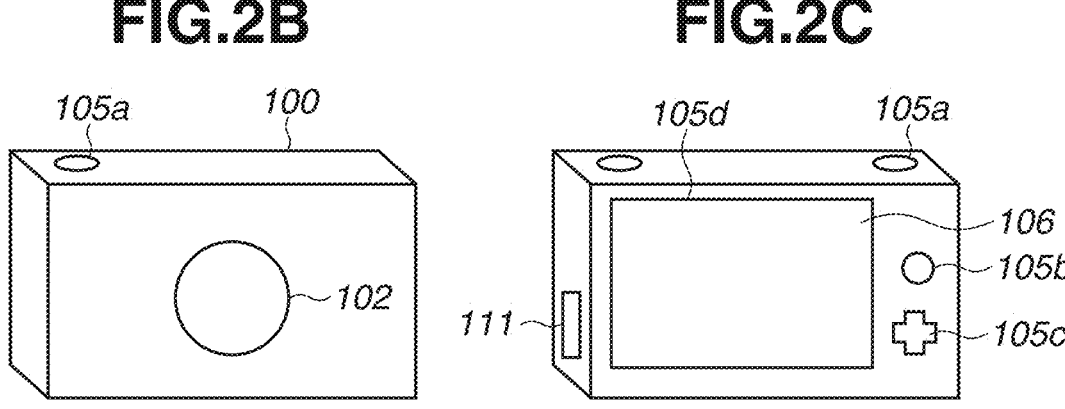

Next, the exterior appearance of the image capturing apparatus 100 will be described. FIGS. 2B and 2C each illustrate an example of the exterior appearance of the image capturing apparatus 100. A release switch 105*a*, a playback button 105*b*, a directional pad 105*c*, and a touch panel 105*d* are operation members included in the operation unit 105 described above. The display unit 106 displays moving images obtained as a result of image capturing by the image capturing unit 102.

An example of the configuration of the image capturing apparatus 100 has been described above.

<Configuration of Communication Apparatus 200>

Figure 3:
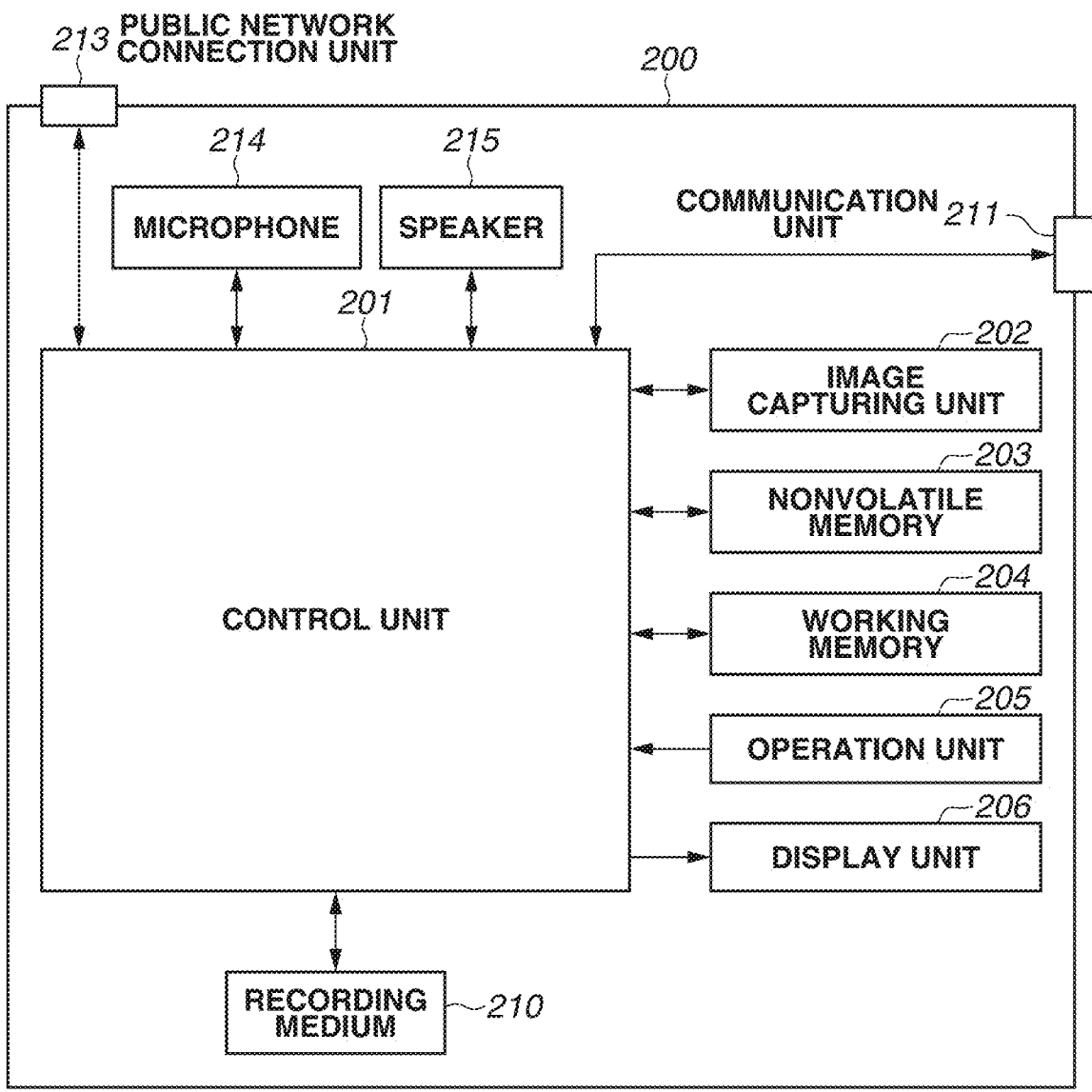
FIG. 3 is a block diagram illustrating an example of a configuration of a communication apparatus according to the first exemplary embodiment.

FIG. 3 is a block diagram illustrating an example of a hardware configuration of the communication apparatus 200 according to the present exemplary embodiment.

While a mobile terminal is described as an example of the communication apparatus 200 in the present exemplary embodiment, the communication apparatus 200 is not limited to this example. For example, the communication apparatus 200 may be a digital camera, a tablet device, or a personal computer with wireless capabilities.

The control unit 201 controls each unit of the communication apparatus 200 based on input signals and programs to be described below. While the control unit 201 controls the entire apparatus in the present exemplary embodiment, a plurality of pieces of hardware may share processing to control the entire apparatus.

An image capturing unit 202 converts object light focused by a lens included in the image capturing unit 202 into an electric signal, performs noise reduction processing or the like on the electric signal, and outputs digital data as moving image data. The captured moving image data is stored in a buffer memory, and then the control unit 201 performs a predetermined arithmetic operation on the moving image data and records the moving image data on a recording medium 210.

A nonvolatile memory 203 is an electrically erasable and recordable nonvolatile memory. An operating system (OS) that is basic software to be executed by the control unit 201 and applications for implementing application functions in cooperation with the OS are recorded on the nonvolatile memory 203.

In the present exemplary embodiment, a transfer application for communicating with the image capturing apparatus 100 and the server 300 is stored in the nonvolatile memory 203.

A working memory 204 is used as an image display memory for a display unit 206, a work area for the control unit 201, or the like.

An operation unit 205 is used to receive instructions for the communication apparatus 200 from the user. The operation unit 205 includes operation members such as a power button for the user to issue a power ON/OFF instruction for the communication apparatus 200, and a touch panel formed on the display unit 206.

The display unit 206 displays, for example, moving image data and texts for interactive operation. The display unit 206 need not necessarily be included in the communication apparatus 200. The communication apparatus 200 may be connectable to the display unit 206 and may include at least a display control function for controlling display of the display unit 206.

The recording medium 210 is configured to record moving image data output from the image capturing unit 202.

The recording medium 210 may be configured to be attached to and detached from the communication apparatus 200, or may be incorporated in the communication apparatus 200. In other words, the communication apparatus 200 may include at least means for accessing the recording medium 210.

A communication unit 211 is an interface for communicating with an external apparatus. The communication apparatus 200 according to the present exemplary embodiment can exchange data with the image capturing apparatus 100 and the server 300 via the communication unit 211. In the present exemplary embodiment, the communication unit 211 is an antenna and the control unit 101 is connectable to the image capturing apparatus 100 via the antenna. The image capturing apparatus 100 and the server 300 may be directly connected or may be connected via an access point. As a protocol for data communication, for example, a Picture Transfer Protocol over Internet Protocol (PTP/IP) via wireless LAN can be used.

The communication unit 211 includes a USB interface for communicating with the external apparatus via a USB cable. The communication with the external apparatus is, however, not limited to this example. For example, the communication unit 211 may include a wireless communication module such as an infrared communication module, a Bluetooth® communication module, and a wireless USB.

A public network connection unit 213 is an interface to be used for public wireless communication.

The communication apparatus 200 can make voice calls with other devices via the public network connection unit 213. In this case, the control unit 201 implements voice calls by inputting and outputting audio signals via a microphone 214 and a speaker 215.

The communication apparatus 200 according to the present exemplary embodiment can also exchange data with the server 300 via the public network connection unit 213. The public network connection unit 213 is an antenna and the control unit 101 is connectable to a public network via the antenna. The communication unit 211 and the public network connection unit 213 can also share a single antenna. In general, the speed of communication via the communication unit 211 is higher than the speed of communication via the public network. Accordingly, the communication apparatus 200 according to the present exemplary embodiment gives priority to communication via the communication unit 211 in a state where voice calls are not made.

An example of the configuration of the communication apparatus 200 has been described above.

In the following description, the image capturing apparatus 100 may be described as a subject of processing. In practice, however, the control unit 101 loads programs stored in the nonvolatile memory 103 to implement various processing.

Further, the communication apparatus 200 may be described as a subject of processing. In practice, however, the control unit 201 loads programs stored in the nonvolatile memory 203 to implement various processing.

<Moving Image File to be Recorded on Image Capturing Apparatus>

In the image capturing apparatus 100, moving image data is generated when an operation is performed on the release switch 105a of the operation unit 105 described above, and the generated moving image data is recorded on the recording medium 110. In the image capturing apparatus 100, upon receiving an image capturing start instruction from the operation unit 105, the control unit 101 starts to record moving image data on the recording medium 110, and continuously records moving image data until receipt of an image capturing stop instruction. In this case, the moving image data generated during a period between the issuance of the image capturing start instruction and the issuance of the image capturing stop instruction is recorded as a single moving image file on the recording medium 110. Thus, a single moving image file is recorded on the recording medium 110 in response to a single image capturing start instruction in many cases.

In some cases, the control unit 101 may record a plurality of moving image files on the recording medium 110 in response to a single image capturing start instruction. An example of this recording operation will be described below.

For example, if a moving image division recording setting is ON in a moving image data recording method, the control unit 101 generates a single chunk recording file every predetermined time during a period from start of image capturing to stop of image capturing, and records the generated chunk recording file on the recording medium 110. In the present exemplary embodiment, the predetermined time for division of a moving image file is 30 seconds. Specifically, the control unit 101 starts to generate and record the first moving image file on the recording medium 110 in response to an image capturing start instruction, and continues recording while updating the first moving image file until a lapse of 30 seconds or until the issuance of an image capturing stop instruction. If the image capturing stop instruction is not issued before the lapse of 30 seconds, the control unit 101 generates a second moving image file and starts to record the second moving image file on the recording medium 110, and continues recording while updating the second moving image file until a lapse of 30 seconds or until the issuance of an image capturing stop instruction. Thus, the control unit 101 generates a single moving image file every 30 seconds after reception of an image capturing start instruction and repeatedly records moving image files on the recording medium 110 until the issuance of an image capturing stop instruction. In this manner, a moving image is divided into moving image files every short period of time during recording of the moving image, thereby making it possible to sequentially transmit recording-completed moving image files to the communication apparatus 200 via the communication unit 111 and to transfer the moving image files to the server 300. In other words, the transmission of moving image data to the server 300 can be completed faster than a case where the transmission of a moving image file is started after receiving an image capturing stop instruction. Thus, a series of moving image files to be sequentially generated in a short period of time is used to achieve high-speed transmission. In general, a series of moving image files is received by the server 300 and then combined into a single moving image file to be used.

<File Structure on Recording Medium 110>

Next, a file structure in the recording medium 110 will be described with reference to FIGS. 4A to 4C.

Figures 4A, 4B, 4C:
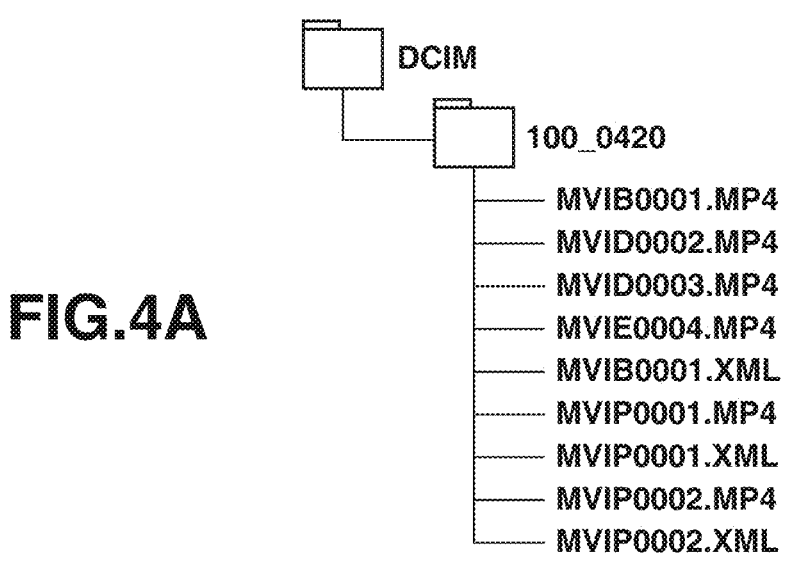
FIGS. 4A to 4C are conceptual diagrams each illustrating a file structure in a recording medium of the image capturing apparatus according to the first exemplary embodiment.

FIG. 4A illustrates a directory structure of moving image files and metadata information files that are recorded on the recording medium 110.

Assume that the inside of the recording medium 110 is formatted in a file system such as Extended File Allocation Table (exFAT) that can be referred to by various OSs.

The control unit 101 records moving image data generated by the image capturing unit 102 in a Motion Picture (MP) 4 file format under a directory "100_0420" (last four digits indicate the current date) under a directory "DCIM". The image capturing apparatus 100 according to the present exemplary embodiment generally uses a prefix "MVI_" for each moving image file, and records each moving image file with a moving image file name having a four-digit numerical value and an extension added after the prefix. The four-digit numerical value is incremented for each moving image file. However, in examples to be described below, a file naming convention that does not follow the above-described rules may be used to record a moving image file group captured in response to a single image capturing start instruction in an identifiable manner. Further, the control unit 101 records metadata information of moving image data in an Extensible Markup Language (XML) file format based on meta template information read out from the nonvolatile memory 103.

The metadata information is information to be used for data management at a delivery destination to which moving image data is transmitted. Information about the category of moving image data, a caption, a comment, or the like of the moving image data is input to an associated tag in an XML file.

FIG. 4B schematically illustrates moving image files and metadata information files of moving image data when a moving image is recorded in a state where the moving image division recording setting is ON in the image capturing apparatus 100. In FIG. 4B, a column 401 indicates a file name of each moving image file. Each file name includes an extension, and the extension makes it possible to identify whether the file is a moving image file or a metadata information file of moving image data. The image capturing apparatus 100 stores a series of chunk recording files (hereinafter referred to as a chunk recording file group) recorded in an identifiable manner in response to a single image capturing instruction in accordance with the file naming convention. Specifically, in the case of recording a plurality of chunk recording files, the image capturing apparatus 100 records the first moving image file with a file name having a prefix "MVIB" and a four-digit numerical value after the prefix. The prefix "MVIB" is obtained by adding the first initial of "Begin" indicating the start of recording to "MVI" indicating a video image file. The character string "MVI" is used for the file name of a video image file and may be determined depending on a recording mode such as a recording format (MP4, Material Exchange Format (MXF)). For a video image file not to be divided or a video image file to be divided into files with a specific file size, a character string obtained by adding "_" to this character string is used as a prefix. The image capturing apparatus 100 records each of the following moving image files with a file name obtained by adding "MVID" as a prefix and further adding values as a serial number for the moving image file that has just been recorded. This prefix "MVID" is obtained by adding the first initial of "Duration" indicating that the moving image file is being recorded (during recording) to "MVI" indicating a video image file. Then, the image capturing apparatus 100 records the moving image file to be recorded last in the series of chunk recording files with a file name obtained by adding "MVIE" as a prefix. This prefix "MVIE" is obtained by adding the first initial of "End" indicating an end point to "MVI" indicating a video image file.

In an example illustrated in FIG. 4B, the image capturing apparatus 100 receives an image capturing start instruction, and then records a moving image file "MVIB0001.MP4" for the first 30 seconds. After that, the image capturing apparatus 100 continuously performs image capturing processing and records moving image files "MVID0002.MP4" and "MVID0003.MP4" at intervals of 30 seconds. Upon receiving an image capturing stop instruction while the image capturing operation is being recorded, the image capturing apparatus 100 records the moving image file to be recorded last in the series of chunk recording files with a file name "MVIE0004.MP4". The control unit 101 records metadata information about moving image data in an XML file format based on meta template information read out from the nonvolatile memory 103. The file name of the metadata information file of moving image data is recorded with the same file name as "MVIB0001" that is used as the file name of the moving image file recorded first.

The metadata information file (MVIB0001.XML) of the moving image data recorded corresponds to the series of chunk recording files. A column 402 indicates an image capturing date and time, and time when generation of each moving image file is started is recorded as the image capturing date and time on the image capturing apparatus 100. Information about the image capturing date and time is recorded as metadata on a predetermined area in the moving image file. A column 403 indicates a moving image recording time. If the file is a moving image file, the moving image recording time is recorded as metadata on a predetermined area in the moving image file. On the other hand, the metadata information file of moving image data is not a moving image file, and thus the image capturing date and time and the moving image recording time are not recorded.

FIG. 4C schematically illustrates information about each moving image file recorded in a state where the moving image division recording setting is OFF in the image capturing apparatus 100. In the present exemplary embodiment, each moving image file recorded in a state where the moving image division recording setting is OFF is a proxy file. The proxy file refers to a size-reduced file with a decreased bit rate or a decreased resolution compared to a normal recording file. The image capturing apparatus 100 stores the proxy file in an identifiable manner based on the file naming convention. Specifically, in the case of recording the proxy file, the image capturing apparatus 100 records the proxy file with a file name having a prefix "MVIP" and a four-digit numerical value added after the prefix. In an example illustrated in FIG. 4C, the image capturing apparatus 100 records each moving image file captured during a period from the reception of the first image capturing start instruction to the reception of an image capturing stop instruction by adding "MVIP0001.MP4" to the moving image file. Further, the control unit 101 records metadata information about the corresponding moving image data in an XML file format based on metadata template information read out from the nonvolatile memory 103.

The file name of the metadata information file of moving image data is recorded with the same file name ("MVIP0001.XML") as "MVIP0001" that is used for the recorded proxy file. The moving image file obtained in second image capturing is recorded with a file name "MVIP0002.MP4", and a metadata information file "MVIP0002.XML" of moving image data corresponding to the moving image file is recorded. While an example where the predetermined time for division of a moving image file is 30 seconds has been described above, the present exemplary embodiment is not limited to this example. If the communication speed is sufficiently high, a longer period of time may be set as the predetermined time. Further, the user may set any period of time through a menu operation so that the time can be changed depending on the performance of a communication line to be used.

If File Allocation Table (FAT) 32 is used as a file system, 4 gigabytes (GBytes) is specified as an upper limit of a file size that can be recognized by the system. Accordingly, if FAT32 is used as a file system, a moving image is divided before the file size of a main moving image file being recorded exceeds 4 GBytes, and a new moving image file is generated to continue the recording. This function can be simultaneously implemented on one apparatus as another function different from the function of dividing a moving image by chunk recording. In the case of dividing a moving image based on a file size that can be recognized by this file system, a file name is generated based on file name generation rules that are same as those used when a new moving image file is generated and are different from the file name generation rules used in the case of dividing a moving image by chunk recording. Specifically, the same character string "MVI" indicating a moving image file is added to each file name and the value following the character string is incremented to identify each file.

Recording of the main moving image file may be executed in parallel with chunk recording and proxy moving image recording.

<Description of Transfer Application Screen (FIGS. 5A to 5D)>

Next, a mode of the transfer application according to the present exemplary embodiment will be described with reference to FIGS. 5A to 5D. The transfer application is an application that runs on the communication apparatus 200. When the transfer application is operated by the control unit 201 in a state where the image capturing apparatus 100 and the communication apparatus 200 are connected, the user can display images stored in the image capturing apparatus 100 on the communication apparatus 200, or can transfer images stored in the image capturing apparatus 100 to the server 300. FIGS. 5A to 5D each illustrate a display example of an operation screen within the transfer application. In this case, when the transfer application is operated by the control unit 201, the control unit 201 displays screens illustrated in FIGS. 5A to 5D on the display unit 206.

A screen 501 illustrated in FIG. 5A is an example of a transfer application function list screen according to the present exemplary embodiment. When the transfer application is activated, the screen 501 is first displayed in a state where the communication apparatus 200 is connected to the image capturing apparatus 100. The transfer application screen includes a button 502 and a button 503. The button 502 is used to select a function for displaying a file recorded on the image capturing apparatus 100. The button 503 is used to select a function for automatically storing a file in the recording medium 210 of the communication apparatus 200 after the file is generated when the image capturing apparatus 100 starts to record a moving image.

FIG. 5B illustrates a screen 504 for displaying a list of files recorded on the image capturing apparatus 100 connected to the communication apparatus 200. When the button 502 is tapped on the screen 501, the screen transitions. A back button 505 is used to return to the previous screen. Components 506 to 511 illustrated in FIG. 5B are generated based on information about a list of files recorded on the connected image capturing apparatus 100 and file information about each file. The icon 506 indicates that the moving image file is a chunk recording file group recorded in a state where the moving image division recording setting is ON in the image capturing apparatus 100. As described above, a chunk recording file group is a group of divided files to be temporarily used so that the moving image file can be rapidly transmitted, and the chunk recording file group is finally combined into one moving image file to be used. If the moving image files in the chunk recording file group are separately displayed, it may be troublesome for the user to view or select a moving image file. Accordingly, it may be desirable to collectively display the chunk recording file group in a selectable manner. On the other hand, a moving image file for which the icon 506 is not displayed indicates a proxy file. The component 507 displays a thumbnail image of a moving image file, and displays a thumbnail image recorded on the moving image file.

The character string 508 indicates a file name of a moving image file. The character string 509 indicates an image capturing date and time of a moving image file. The character string 510 indicates a moving image capturing time of a moving image file.

The icon 511 indicates whether a metadata file indicating metadata information about a moving image file is stored in the same recording medium.

Icons 512 and 513 indicate a file selected state and a file non-selected state, respectively, and are displayed in a superimposed manner on the thumbnail image 507. The icon 512 indicates a selected state, and the icon 513 indicates a non-selected state. Tapping the thumbnail image 507 for each file enables switching between the file selected state and the file non-selected state, and the icon to be displayed also switches.

A button 514 is a button for starting to store a file in the recording medium 210 of the communication apparatus 200 from the image capturing apparatus 100. Each file in the selected state as described above is a file to be stored.

The transfer application according to the present exemplary embodiment can select an image from the list of files recorded on the image capturing apparatus 100 and can store the file in the recording medium 210 of the communication apparatus 200. If the list of files recorded on the image capturing apparatus 100 includes a chunk recording file group, the file is displayed with the icon 506 indicating a chunk recording file group. The chunk recording file group is a group of divided files to be temporarily used so that the moving image file can be rapidly transmitted, and is finally combined into one moving image file to be used. If the chunk recording files are separately stored in the communication apparatus 200, it may be troublesome for the user to perform operations such as selection of a chunk recording file or search for a chunk recording file in the communication apparatus 200, which makes it difficult for the user to manage files.

A method for preventing chunk recording files from being separately stored if the file to be stored in the recording medium 210 is a chunk recording file will be described below.

<Flow of Processing to be Performed by Communication Apparatus 200 to Store Moving Image File in Camera>

Figure 6A:
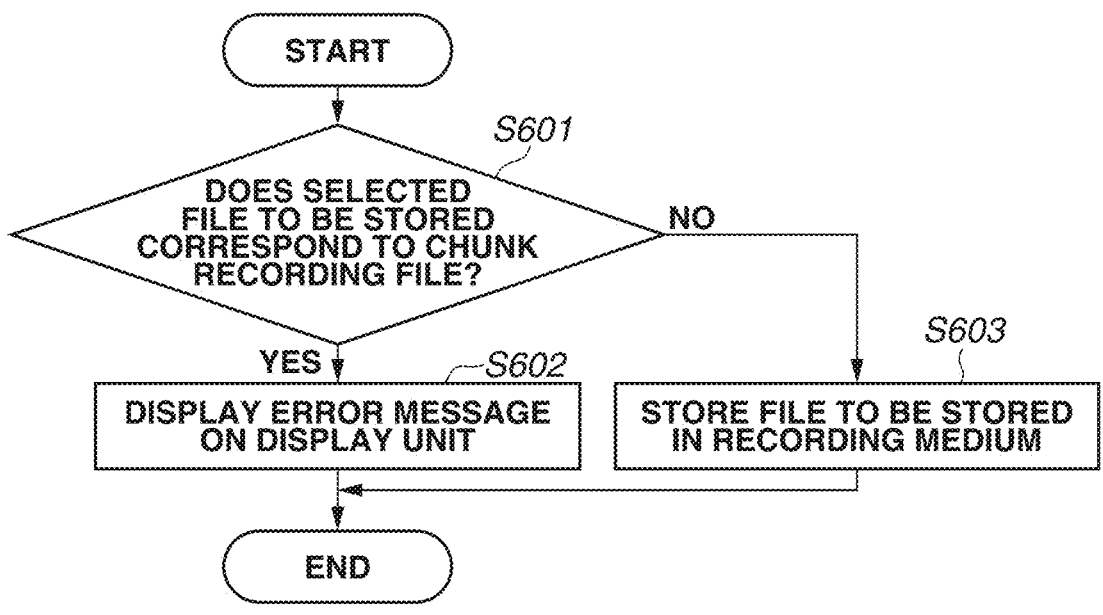
FIGS. 6A to 6C are flowcharts each illustrating a flow of processing performed by the communication apparatus according to the first exemplary embodiment when the communication apparatus receives a file obtaining execution instruction.
Figure 6B:
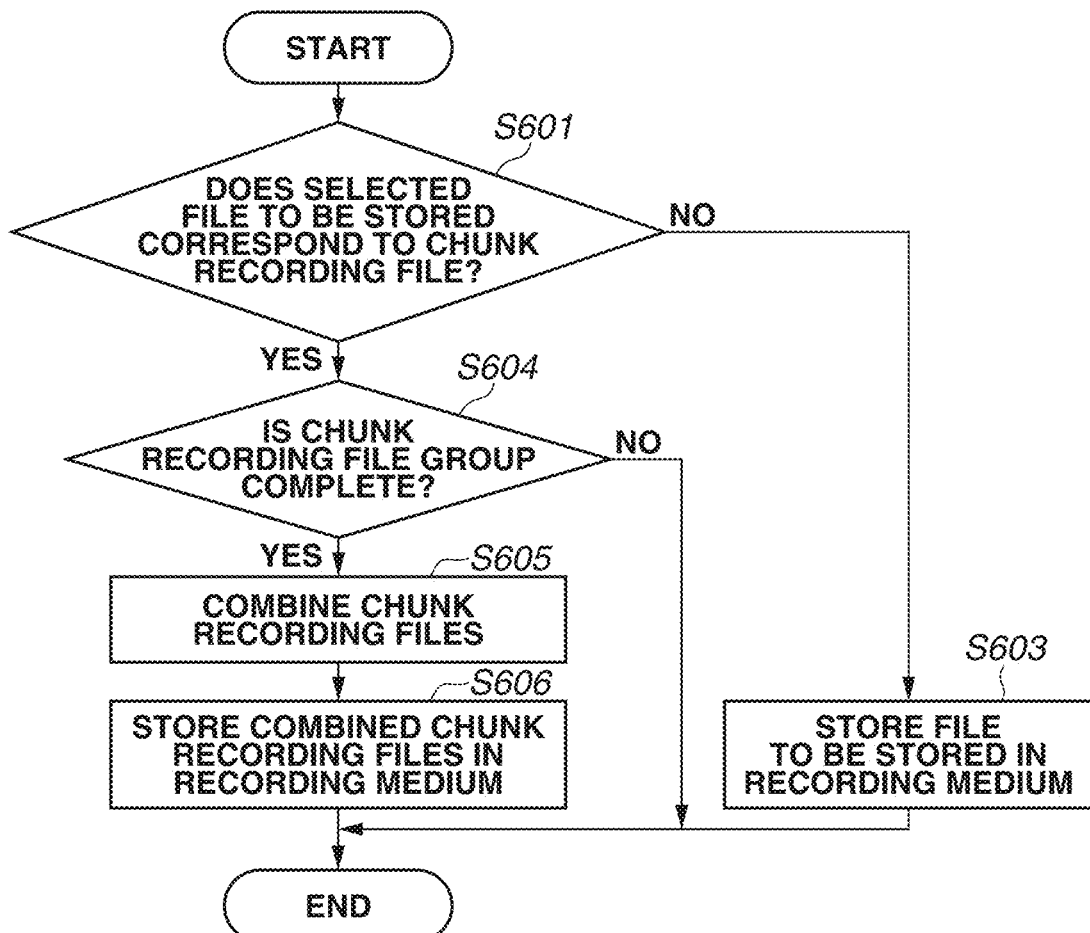
Figure 6C:
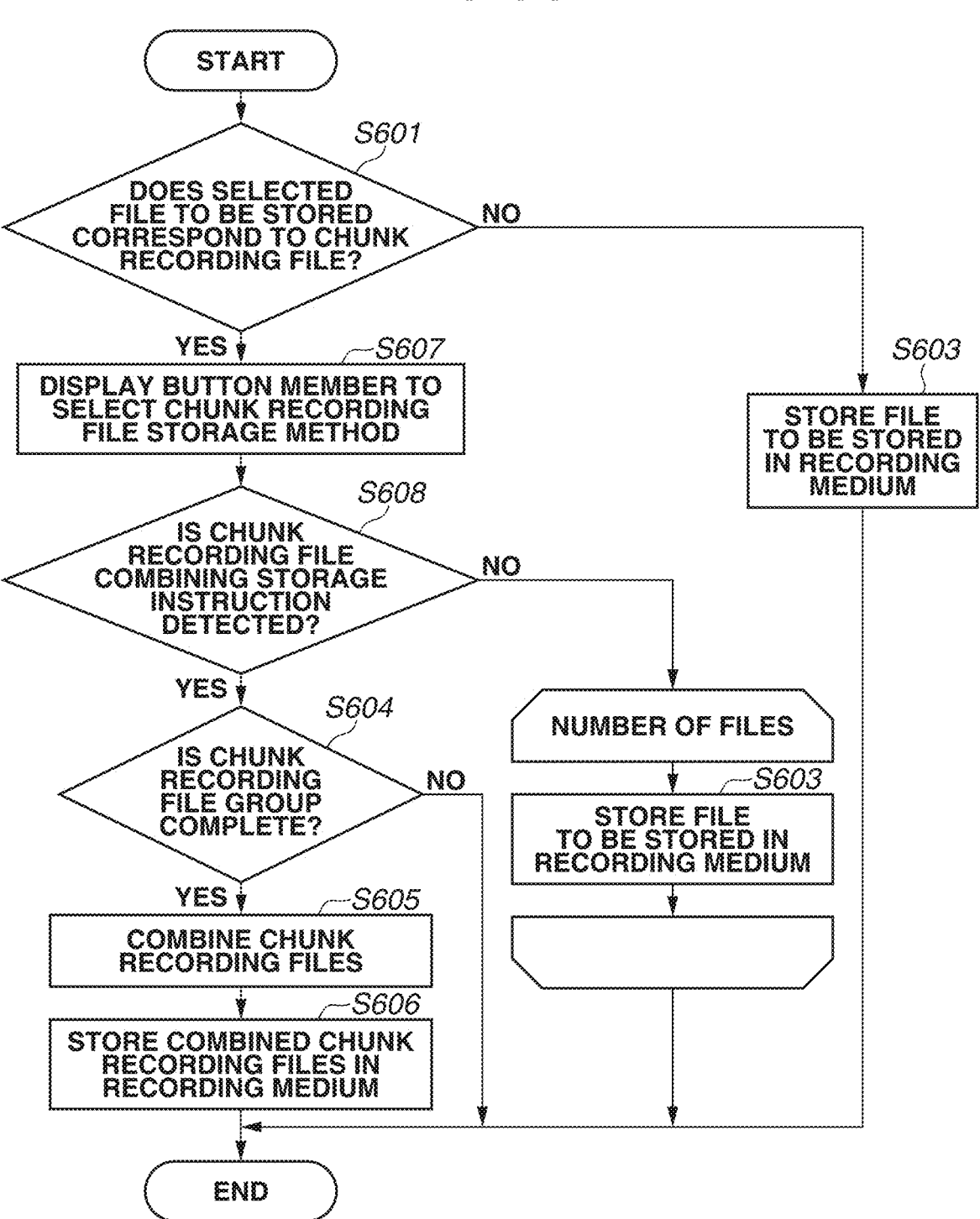

FIGS. 6A to 6C are flowcharts each illustrating an operation of the communication apparatus 200 when a file recorded on the image capturing apparatus 100 is stored in the recording medium 210 in a state where the image capturing apparatus 100 and the communication apparatus 200 are connected via the communication unit 111 and the communication unit 211 according to the present exemplary embodiment.

Processing in the flowcharts is implemented by the control unit 201 controlling each unit of the communication apparatus 200 based on input signals and programs. Assume that the transfer application is activated in the communication apparatus 200 when the processing of the flowcharts illustrated in FIGS. 6A to 6C is started.

The processing in the flowcharts is executed upon detection of tapping on the button 514 in a state where a file is selected from the file list on the operation unit 205 during display of the screen 504 illustrated in FIG. 5B in the transfer application.

A plurality of files may be selected from the file list displayed on the screen 504 and the plurality of files may be stored by tapping the button 514. However, for ease of explanation, assume herein that one file is selected, and the selected file is stored by tapping the button 514.

In step S601 of the flowchart illustrated in FIG. 6A, the control unit 201 determines whether the file to be stored selected from the file list is a chunk recording file group. If the file to be stored is not a chunk recording file group (NO in step S601), the processing proceeds to step S603. In step S603, the file to be stored is stored in the recording medium 210 of the communication apparatus 200. If the file to be stored is a chunk recording file group (YES in step S601), the processing proceeds to step S602. In step S602, an error message is displayed on the display unit 206, and the processing is terminated without storing the file to be stored in the recording medium 210. FIG. 5C illustrates a display example of the error message displayed in step S602. The error message is displayed on a dialog 515 illustrated in FIG. 5C.

The above-described processing makes it possible to prevent chunk recording files from being separately stored in the recording medium 210 of the communication apparatus 200 in a case where the file to be stored in the recording medium 210 is a chunk recording file.

The communication apparatus 200 may have a function for storing a file into which chunk recording files constituting a chunk recording file group are combine in the recording medium 210 when the button 514 is tapped in a state where the chunk recording file group is selected. FIG. 6B illustrates a processing flow for this operation.

In FIG. 6B, the description of processes of steps that are similar to those in FIG. 6A is omitted.

In step S601 of the flowchart illustrated in FIG. 6B, if the file to be stored is a chunk recording file group (YES in step S601), the processing proceeds to step S604. In step S604, the control unit 201 determines whether the chunk recording file group is complete (i.e., any file or portion of it is missing). If the chunk recording file group is complete (YES in step S601), it is determined that consecutive chunk recording files have been recorded on the recording medium 110, and the processing proceeds to step S605. In step S605, the chunk recording files in the chunk recording file group are combined. Whether the chunk recording file group is complete can be determined based on the file name of each chunk recording file included in the chunk recording file group. For example, in the chunk recording file group recorded on the recording medium 110 illustrated in FIG. 4B, if "MVID0003.MP4" is missing from the recording medium 110, it is determined that consecutive chunk recording files have not been recorded. In this case, the processing is terminated without storing the file to be stored in the recording medium 210.

In step S606 of the flowchart illustrated in FIG. 6B, the control unit 201 stores the file into which the chunk recording files constituting the chunk recording file group are combined in the recording medium 210 of the communication apparatus 200.

The above-described processing makes it possible to store the file into which the chunk recording files are combined in the recording medium 210 in a case where the file to be stored in the recording medium 210 is a chunk recording file.

The communication apparatus 200 may also include a setting that allows the user to select whether to store a file into which chunk recording files constituting a chunk recording file group are combined, or to store chunk recording files without combining the chunk recording files, when the button 514 is tapped in a state where the chunk recording file group is selected. FIG. 6C illustrates a processing flow for this operation.

In FIG. 6C, the description of processes of steps that are similar to those in FIG. 6A is omitted.

If it is determined that the file to be stored is a chunk recording file group in step S601 of the flowchart illustrated in FIG. 6C (YES in step S601), the processing proceeds to step S607. In step S607, the control unit 201 displays a button member to prompt the user to select a chunk recording file storage method. FIG. 5D illustrates an example of the button member displayed in step S607. A button 516 illustrated in FIG. 5D is a button for the user to select the method of storing a file by combining chunk recording files constituting a chunk recording file group. A button 517 is a button for the user to select the method of storing chunk recording files constituting the chunk recording file group without combining the chunk recording files.

In step S608 of the flowchart illustrated in FIG. 6C, the control unit 201 determines whether a chunk recording file group combining storage instruction is detected. A state where the combining storage instruction is detected indicates a state where the control unit 201 detects tapping on the button 516 illustrated in FIG. 5D. A state where the combining storage instruction is not detected indicates a state where the control unit 201 detects tapping on the button 517 illustrated in FIG. 5D.

If the chunk recording file group combining storage instruction is detected in step S608 of the flowchart illustrated in FIG. 6C (YES in step S608), processing in steps S604 to S606 of the flowchart illustrated in FIG. 6B is executed. On the other hand, if the combining storage instruction is not detected in step S608 (NO in step S608), the processing in step S603 is executed on all chunk recording files constituting the chunk recording file group.

The above-described processing enables the communication apparatus 200 to appropriately store the file to be stored selected from the file list displayed on the screen 504 in the recording medium 210 of the communication apparatus 200 based on each processing flow.

In the first exemplary embodiment described above, if the button 514 is tapped in a state where a chunk recording file group is selected on the file list display screen displayed on the transfer application, an error message is displayed to prevent the chunk recording file group from being stored in the recording medium 210. However, the method for restricting the storage of a chunk recording file is not limited to this method.

For example, if a chunk recording file group is in the selected state on the file list display screen displayed on the transfer application, the button 514 may be hidden.

If a chunk recording file group is in the selected state on the file list display screen displayed on the transfer application, the button 514 may be deactivated so as not to respond even when the button 514 is operated. In this case, the display mode of the button 514 may be changed to a display mode indicating an inexecutable state. For example, the button 514 may be displayed in a dark color.

For a chunk recording file group on the file list display screen displayed on the transfer application, the icon 512 indicating the file selected state and the icon 513 indicating the file non-selected state may be hidden. This setting makes it possible to prevent a chunk recording file from being selected as a file to be received.

For a chunk recording file group on the file list display screen displayed on the transfer application, the icon 512 indicating the file selected state and the icon 513 indicating the file non-selected state icon 513 may be deactivated so as not to respond even when the icons 512 and 513 are operated. In this case, the icons 512 and 513 may be displayed in a dark color to indicate an invalid state or an unselectable state.

Further, for a chunk recording file group on the file list display screen displayed on the transfer application, an error message indicating that the file is not selectable may be displayed when the icon 513 indicating the file non-selected state is tapped.

Furthermore, for a chunk recording file group on the file list display screen displayed on the transfer application, the chunk recording file group may be controlled not to be displayed on the file list display screen.

In the first exemplary embodiment described above, it is selectable whether to store a file into which chunk recording files constituting a chunk recording file group are combined, or to store chunk recording files without combining the chunk recording files during storage. However, the present exemplary embodiment is not limited to this example.

For example, in the transfer application, whether to store a file into which chunk recording files constituting a chunk recording file group are combined, or to store chunk recording files without combining the chunk recording files may be set in advance.

Next, a second exemplary embodiment will be described.

According to the first exemplary embodiment described above, in the transfer application, when a file is selected from the screen for displaying the list of files recorded on the image capturing apparatus 100 connected to the communication apparatus 200 and the button 514 is tapped, storage processing in the recording medium 210 of the communication apparatus 200 is started.

In second exemplary embodiment, a description will be given of an example where the communication apparatus 200 receives a recording-completed moving image file while the image capturing apparatus 100 is recording a moving image using a moving image division recording function, and the communication apparatus 200 performs storage processing depending on the type of each file, thereby automatically and immediately storing the moving image in the recording medium 210.

In the second exemplary embodiment, the image capturing apparatus 100, the communication apparatus 200, the server 300, and the system configuration are similar to those in the first exemplary embodiment, and thus descriptions thereof are omitted.

<Flow of Processing to be Performed by Communication Apparatus 200 to Automatically Store Moving Image File Generated by Image Capturing Apparatus 100 (FIG. 7)>

Figure 7:
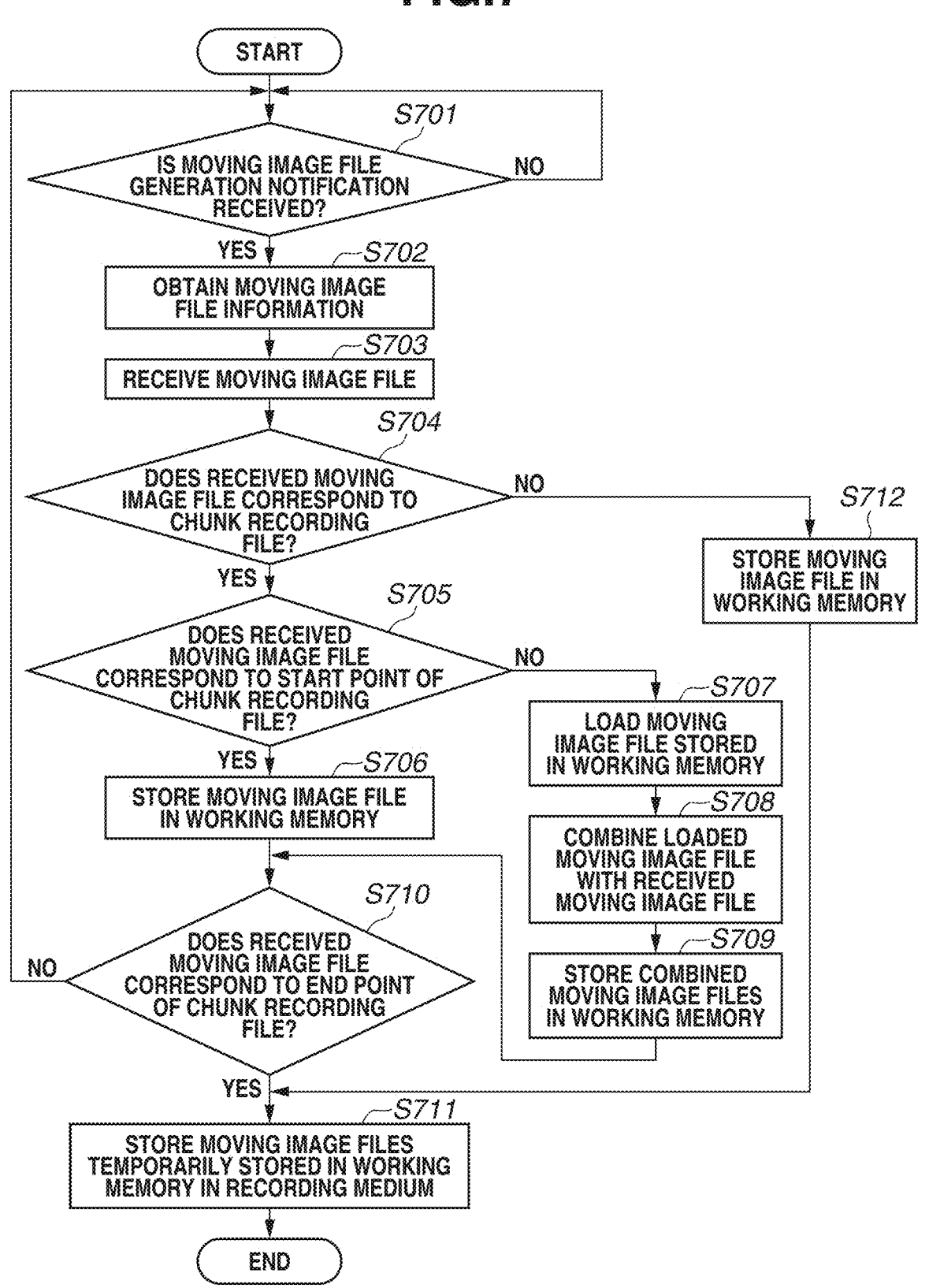
FIG. 7 is a flowchart illustrating a flow of processing performed by the communication apparatus to automatically store a moving image file generated by the image capturing apparatus according to a second exemplary embodiment.

FIG. 7 is a flowchart illustrating an operation of the communication apparatus 200 when the communication apparatus 200 receives a moving image file generated and recorded by the image capturing apparatus 100 and automatically stores the moving image file in the recording medium 210 in a state where the image capturing apparatus 100 and the communication apparatus 200 are connected in the present exemplary embodiment.

In the transfer application, when the button 503 illustrated in FIG. 5A is tapped, the screen transitions to a screen having a function for automatically storing a file, which is generated when the communication apparatus 200 receives an image capturing start instruction from the image capturing apparatus 100, in the recording medium 210 included in the communication apparatus 200. This screen is hereinafter referred to as a file automatic storage screen.

Processing in this flowchart is implemented by the control unit 201 controlling each unit of the communication apparatus 200 based on input signals and programs. Assume that the file automatic storage screen of the transfer application is displayed on the communication apparatus 200 when processing in the flowchart illustrated in FIG. 7 is started.

This flowchart illustrates processing to be executed when the control unit 201 receives an image capturing start instruction from the image capturing apparatus 100 during display of the file automatic storage screen of the transfer application.

In step S701 of the flowchart illustrated in FIG. 7, the control unit 201 determines whether a moving image file generation notification is received from the image capturing apparatus 100. If the notification is not received (NO in step S701), the control unit 201 waits until the notification is received. If the notification is received (YES in step S701), the processing proceeds to step S702. In step S702, the control unit 201 obtains information about the moving image file from an event data set included in the moving image file generation notification. While the control unit 201 obtains information about the moving image file from the event data set included in the moving image file generation notification in the present exemplary embodiment, the present exemplary embodiment is not limited to this example. For example, a request for the information about the moving image file may be sent to the image capturing apparatus 100 to obtain the information about the moving image file.

In step S703 of the flowchart illustrated in FIG. 7, the control unit 201 receives a moving image file from the image capturing apparatus 100. In step S704, the control unit 201 determines whether the received moving image file is a chunk recording file. As described above, whether the moving image file is a chunk recording file can be identified based on the file naming convention. If the received moving image file is not a chunk recording file (NO in step S704), the processing proceeds to step S712. In step S712, the moving image file is stored in the working memory 204. On the other hand, if the received moving image file is a chunk recording file (YES in step S704), the processing proceeds to step S705. In step S705, it is determined whether the moving image file corresponds to a start point of the chunk recording file. Whether the moving image file corresponds to the start point of the chunk recording file can be determined based on whether the character that follows the prefix "MVI" of the moving image file name is "B".

In step S705 of the flowchart illustrated in FIG. 7, if the received moving image file corresponds to the start point of the chunk recording file (YES in step S705), the processing proceeds to step S706. If the received moving image file corresponds to the start point of the chunk recording file (YES in step S705), then in step S706, for example, "MVIB0001.MP4" is temporarily stored in the working memory 204. If the received moving image file does not correspond to the start point of the chunk recording file (NO in step S705), the processing proceeds to step S707, and then the processing in steps S707 to S709 is executed.

In step S707 of the flowchart illustrated in FIG. 7, the control unit 201 loads the moving image file stored in the working memory 204. In step S708, the control unit 201 combines the moving image file loaded from the working memory 204 with the moving image file received in step S703. For example, "MVIB0001.MP4" temporarily stored in the working memory 204 is combined with the moving image file "MVID0002.MP4" received in step S703.

In step S709 of the flowchart illustrated in FIG. 7, the control unit 201 stores the combined moving image file generated in step S708 in the working memory 204. The chunk recording files are sequentially combined by repeating the processing in steps S707 to S709, and the combined files are stored in the working memory 204.

In step S710 of the flowchart illustrated in FIG. 7, the control unit 201 determines whether the moving image file received in step S703 corresponds to an end point of the chunk recording file. Whether the moving image file corresponds to the end point of the chunk recording file can be determined based on whether the character that follows the prefix "MVI" of the moving image file name is "E". If the moving image file received in step S703 does not correspond to the end point of the chunk recording file (NO in step S710), the processing returns to step S701 and the control unit 201 waits until the moving image file generation notification is received from the image capturing apparatus 100. If the moving image file received in step S703 corresponds to the end point of the chunk recording file (YES in step S710), the processing proceeds to step S711. In step S711, the moving image file stored in the working memory 204 is stored in the recording medium 210 of the communication apparatus 200.

The above-described processing enables the communication apparatus 200 to automatically store a file in the recording medium 210 by sequentially combining chunk recording files generated and recorded by the connected image capturing apparatus 100.

In the second exemplary embodiment described above, the communication apparatus 200 stores a file into which chunk recording files from the start point of the chunk recording file received upon start of image capturing in the image capturing apparatus 100 to the end point of the chunk recording file received upon end of image capturing in the recording medium 210 are sequentially combined. However, the present exemplary embodiment is not limited to this example. For example, the file automatic storage function may include a setting for storing chunk recording files constituting a chunk recording file group without combining the chunk recording files, and chunk recording files may be stored in the recording medium 210 at a timing when the communication apparatus 200 receives each chunk recording file from the image capturing apparatus 100.

Other Exemplary Embodiments

The present disclosure can also be implemented by the following processing. That is, a program for implementing one or more functions according to the exemplary embodiments described above is supplied to a system or an apparatus via a network or a storage medium, and one or more processors in a computer of the system or the apparatus read out and execute the program. The present disclosure can also be implemented by a circuit (e.g., an application-specific integrated circuit (ASIC)) for implementing one or more functions according to the exemplary embodiments described above.

In the exemplary embodiments described above, it is determined whether the received file is a chunk recording file based on the file naming convention. However, the present disclosure is not limited to this example.

For example, it may be determined whether the received file is a chunk recording file based on information included in a metadata information file of moving image data.

While some exemplary embodiments of the present disclosure are described above, the present disclosure is not limited to the exemplary embodiments. Various modifications and changes may be made within the scope of the disclosure.

According to an aspect of the present disclosure, it is possible to reduce the possibility of impairing user convenience.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-087975, filed May 29, 2023, which is hereby incorporated by reference herein in its entirety.

What is claimed is:

1. A communication apparatus comprising:
a network interface that communicates with an image capture apparatus;
a display device configured to display a file obtained from the image capture apparatus via the network interface;
at least one memory for storing the obtained file which is being displayed on the display device, and also storing executable instructions; and
at least one processor, that upon execution of the stored instructions, is configured to
determine whether the obtained file being displayed on the display device is a chunk recording file, and
restrict storage of the obtained file when it is determined that the obtained file to be stored is a chunk recording file, wherein
in a case where it is determined that the file obtained from the image capturing apparatus is a chunk recording file, control display of the file such that the file is visible but not selectable.

2. The communication apparatus according to claim 1, wherein execution of the stored instructions further configures the at least one processor to operate to:
in a case where the file obtained from the image capture apparatus is to be stored, determine whether the file is a chunk recording file, and
in a case where the file to be stored is a chunk recording file, store a file into which a series of chunk recording files including the file is combined.

3. The communication apparatus according to claim 1, wherein execution of the stored instructions further configures the at least one processor to, in a case where a chunk recording file obtained from the image capturing apparatus is to be stored, select whether to store a file into which a series of chunk recording files including the file is combined, or store chunk recording files without combining the chunk recording files.

4. The communication apparatus according to claim 1, wherein execution of the stored instructions further configures the at least one processor to operate to, in a case where the file obtained from the image capturing apparatus via the communication unit is a chunk recording file, control the chunk recording file not to be displayed on the display device.

5. The communication apparatus according to claim 1, wherein execution of the stored instructions further configures the at least one processor to operate to display the file obtained from the image capturing apparatus in an invalid state such that the file is not selectable on the display device.

6. The communication apparatus according to claim 1, wherein it is determined whether the file obtained from the image capture apparatus is a chunk recording file based on a file name of the file.

7. The communication apparatus according to claim 1, wherein it is determined whether the file obtained from the image capture apparatus is a chunk recording file based on metadata information included in the file.

8. A communication apparatus comprising:
a network interface that communicates with an image capture apparatus;
a display device configured to display a file obtained from the image capture apparatus via the network interface;
at least one memory for storing the obtained file which is being displayed on the display device, and also storing executable instructions; and
at least one processor, that upon execution of the stored instructions, is configured to:
determine whether a received video image file is a chunk recording file;
temporarily store the received video image file in a case where the received video image file is a chunk recording file;
repeatedly perform processing of combining a video image file to be subsequently received with the temporarily stored video image file, and temporarily store a combined file into which the video image files are combined until end of image capturing; and
storing the combined file, wherein
in a case where it is determined that the received video image file is a chunk recording file, control display of the file such that the received video image file is visible but not selectable.

9. A control method for a communication apparatus including a network interface that communicates with an image capture apparatus, and a display device configured to display a file obtained from the image capture apparatus via the network interface, the control method comprising:
storing the obtained file which is being displayed on the display device;
determining whether the obtained file being displayed on the display device is a chunk recording file;
controlling display of the obtained file such that the obtained file is visible but not selectable in a case where it is determined that the obtained file is a chunk recording file, control display of the file such that the file is visible but not selectable and
restricting storage of the obtained file when it is determined that the obtained file to be stored is a chunk recording file.

10. A control method for a communication apparatus, the communication apparatus including:

a communication unit configured to communicate with an image capturing apparatus; and a storage unit, the control method comprising:

receiving a recording-completed moving image file from the image capturing apparatus via the communication unit; and determining whether the received moving image file is a chunk recording file, wherein, in a case where the file is a chunk recording file, the file is temporarily stored, wherein processing of combining a moving image file to be subsequently received with the temporarily stored moving image file, and temporarily storing a combined file into which the combined moving image files are combined is repeatedly performed until end of image capturing, wherein combined files obtained by repeatedly performing the processing are stored in the storage unit, and wherein in a case where it is determined that the received video image file is a chunk recording file, control display of the file such that the received video image file is visible but not selectable.

11. A non-transitory computer-readable storage medium that stores instructions that, when executed by at least one processor of a communication apparatus executes a control method for a communication apparatus including a network interface that communicates with an image capture apparatus, and a display device configured to display a file obtained from the image capture apparatus via the network interface, the control method comprising:

storing the obtained file which is being displayed on the display device;

determining whether the obtained file being displayed on the display device is a chunk recording file;

controlling display of the obtained file such that the obtained file is visible but not selectable in a case where it is determined that the obtained file is a chunk recording file, control display of the file such that the file is visible but not selectable; and restricting storage of the obtained file when it is determined that the obtained file to be stored is a chunk recording file.

* * * * *